United States Patent
Pang et al.

(10) Patent No.: US 11,942,992 B2
(45) Date of Patent: Mar. 26, 2024

(54) OPERATION METHOD OF NETWORK DEVICE AND CONTROL CHIP OF NETWORK DEVICE

(71) Applicant: REALTEK SEMICONDUCTOR CORPORATION, Hsinchu (TW)

(72) Inventors: Jia-You Pang, Hsinchu (TW); Po-Wei Liu, Hsinchu (TW); Jui-Chiang Wang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/702,044

(22) Filed: Mar. 23, 2022

(65) Prior Publication Data
US 2022/0360331 A1    Nov. 10, 2022

(30) Foreign Application Priority Data

May 4, 2021    (TW) ................. 110115963

(51) Int. Cl.
*H04B 10/25*    (2013.01)
*H04B 10/07*    (2013.01)
*H04B 10/079*    (2013.01)
*H04B 10/40*    (2013.01)
*H04B 10/69*    (2013.01)
*H04L 1/00*     (2006.01)
(Continued)

(52) U.S. Cl.
CPC ............. *H04B 10/25* (2013.01); *H04B 10/07* (2013.01); *H04B 10/07955* (2013.01); *H04B 10/2589* (2020.05); *H04B 10/40* (2013.01); *H04B 10/6932* (2013.01); *H04L 1/0002* (2013.01); *H04L 5/1446* (2013.01); *H04L 12/40136* (2013.01)

(58) Field of Classification Search
CPC .. H04B 10/25; H04B 10/07; H04B 10/07955; H04B 10/2589; H04B 10/40; H04B 10/6932; H04L 12/40136; H04L 1/0002; H04L 49/557; H04L 49/65; H04L 69/24; H04L 5/1446
USPC ................ 398/9–38, 135–139, 140–172
See application file for complete search history.

(56) References Cited

U.S. PATENT DOCUMENTS

| | | | | |
|---|---|---|---|---|
| 6,055,241 A * | 4/2000 | Raza | ...................... | H04L 49/351 370/408 |
| 7,437,079 B1 * | 10/2008 | Hofmeister | ............ | H04B 10/40 375/219 |
| 9,130,695 B1 * | 9/2015 | Dalmia | ................. | H04L 1/0001 |

(Continued)

OTHER PUBLICATIONS

Clause 24.2 Physical Coding Sublayer (PCS)—(Section 2, p. 182-200), 2015, IEEE.
(Continued)

*Primary Examiner* — Dibson J Sanchez
(74) *Attorney, Agent, or Firm* — WPAT, P.C.

(57) ABSTRACT

An operation method of a network device and a control chip of the network device are provided. The network device receives an input signal through a fiber medium. The operation method includes the following steps: setting a target speed of the network device to a first speed; transmitting and/or receiving a data at the first speed; and setting the target speed of the network device to a second speed which is different from the first speed when the amplitude or energy of the input signal is not greater than a threshold.

10 Claims, 4 Drawing Sheets

(51) Int. Cl.
*H04L 5/14* (2006.01)
*H04L 12/40* (2006.01)

(56) References Cited

U.S. PATENT DOCUMENTS

| | | | | |
|---|---|---|---|---|
| 9,363,039 | B1* | 6/2016 | Farjadrad | H04L 1/0033 |
| 10,862,587 | B2* | 12/2020 | Kasuga | H04B 10/60 |
| 2002/0181055 | A1* | 12/2002 | Christiansen | H04B 10/2587 |
| | | | | 398/118 |
| 2003/0231887 | A1* | 12/2003 | Grassi | H04B 10/1127 |
| | | | | 398/130 |
| 2004/0184810 | A1* | 9/2004 | Spilman | H04L 1/0002 |
| | | | | 398/139 |
| 2005/0073965 | A1* | 4/2005 | Yamauchi | H04L 43/00 |
| | | | | 370/293 |
| 2005/0111843 | A1* | 5/2005 | Takeuchi | H04B 10/077 |
| | | | | 398/38 |
| 2005/0238357 | A1* | 10/2005 | Farrell | H04B 10/1123 |
| | | | | 398/119 |
| 2007/0081475 | A1* | 4/2007 | Telado | H04L 1/007 |
| | | | | 370/255 |
| 2007/0127920 | A1* | 6/2007 | Ghiasi | H04L 69/323 |
| | | | | 398/25 |
| 2008/0317069 | A1* | 12/2008 | Huang | H04L 5/1438 |
| | | | | 370/503 |
| 2009/0080459 | A1* | 3/2009 | Barkan | H04L 12/4013 |
| | | | | 370/463 |
| 2009/0187778 | A1* | 7/2009 | Diab | G06F 1/3209 |
| | | | | 713/600 |
| 2009/0232151 | A1* | 9/2009 | Furlong | H04L 12/6418 |
| | | | | 370/419 |
| 2010/0153589 | A1* | 6/2010 | Maroni | G06F 13/4072 |
| | | | | 710/18 |
| 2010/0211831 | A1* | 8/2010 | Fujiyama | H04L 43/0811 |
| | | | | 714/57 |
| 2012/0191887 | A1* | 7/2012 | Yamauchi | G06F 13/4282 |
| | | | | 710/106 |
| 2015/0171961 | A1* | 6/2015 | Featherston | H04B 10/07955 |
| | | | | 398/38 |
| 2016/0182154 | A1* | 6/2016 | Fang | H04B 10/2575 |
| | | | | 398/116 |
| 2019/0064909 | A1* | 2/2019 | Bito | G06F 1/325 |

OTHER PUBLICATIONS

Clause 26 Physical Medium Dependent (PMD) sublayer and baseband medium, type 100BASE-FX—(Section 2, p. 240-243), 2015, IEEE.

Clause 37 Auto-Negotiation function, type 1000BASE-X—(Section 3, p. 105-128), 2015, IEEE.

* cited by examiner

OPERATION METHOD OF NETWORK DEVICE AND CONTROL CHIP OF NETWORK DEVICE

BACKGROUND OF THE INVENTION

1. Field of the Invention

The present invention generally relates to a network device, and, more particularly, to a control chip of the network device and an operation method of the network device that can prevent the false link-up of the network device.

2. Description of Related Art

In the prior art, two network devices (one of which is referred to as the local device and the other the link partner of the local device) that are connected via the fiber medium are required to check a reliable link-up therebetween before sending packets or user datagram. In other words, the physical layer (PHY layer) of the network device have to ensure that a reliable link-up has been established before providing services to its upper layer (i.e., the Medium Access Control layer (MAC layer)).

The process of establishing link-up with auto negotiation disabled includes the following steps: (1) the local device transmits a code group (e.g., an 8-bit/10-bit (8 b/10 b) code group or a 4-bit/5-bit (4 b/5 b) code group) to its link partner; (2) the link partner evaluates the quality of the received signal and determines whether the code group is correctly decoded; (3) when the signal quality is acceptable and the code group can be decoded correctly, the link partner claims that it has established a link-up with the local device.

A reliable link-up between two network devices requires each to claim the establishment of the link-up with the other party. However, when one way of the fiber medium has been broken, only one of the two network devices can establish a link-up. Unfortunately, owing to the limitations of the specifications defined in IEEE 802.3, the link partner that fails to claim the establishment of the link-up is unable to inform the local device of its fault information, which may result in a one-sided link-up state. The one-sided link-up state, which may lead to packet loss and even cause problems to the upper layer(s) of the open systems interconnection model (OSI model), is unacceptable and should be avoided.

SUMMARY OF THE INVENTION

In view of the issues of the prior art, an object of the present invention is to provide an operation method of a network device and a control chip of the network device, so as to make an improvement to the prior art.

According to one aspect of the present invention, an operation method of a network device is provided. The network device receives an input signal through a fiber medium. The method includes the following steps: setting a target speed of the network device to a first speed; transmitting and/or receiving a data at the first speed; and setting the target speed of the network device to a second speed which is different from the first speed when an amplitude or energy of the input signal is not greater than a threshold.

According to another aspect of the present invention, a control chip of a network device is provided. The network device receives an input signal through a fiber medium. The control chip includes an analog front-end (AFE) circuit, a control circuit, and a media selection unit. The AFE circuit is configured to receive the input signal. The control circuit is configured to generate a speed setting signal according to a first speed and a detection signal which represents an amplitude or energy of the input signal. The media selection unit is coupled to the control circuit and configured to determine a target speed of the network device according to the speed setting signal. When the detection signal indicates that the amplitude or energy of the input signal is greater than a threshold, the control circuit controls, through the speed setting signal, the media selection unit to select the first speed as the target speed. When the detection signal indicates that the amplitude or energy of the input signal is not greater than the threshold, the control circuit controls, through the speed setting signal, the media selection unit to select a second speed as the target speed. The second speed is different from the first speed.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an operation method of a network device and a control chip of the network device. On account of that some or all elements of the control chip of the network device could be known, the detail of such elements is omitted provided that such detail has little to do with the features of this disclosure, and that this omission nowhere dissatisfies the specification and enablement requirements. Some or all of the processes of the operation method of a network device may be implemented by software and/or firmware, and can be performed by the control chip of the network device or its equivalent. A person having ordinary skill in the art can choose components or steps equivalent to those described in this specification to carry out the present invention, which means that the scope of this invention is not limited to the embodiments in the specification.

Figure 1:
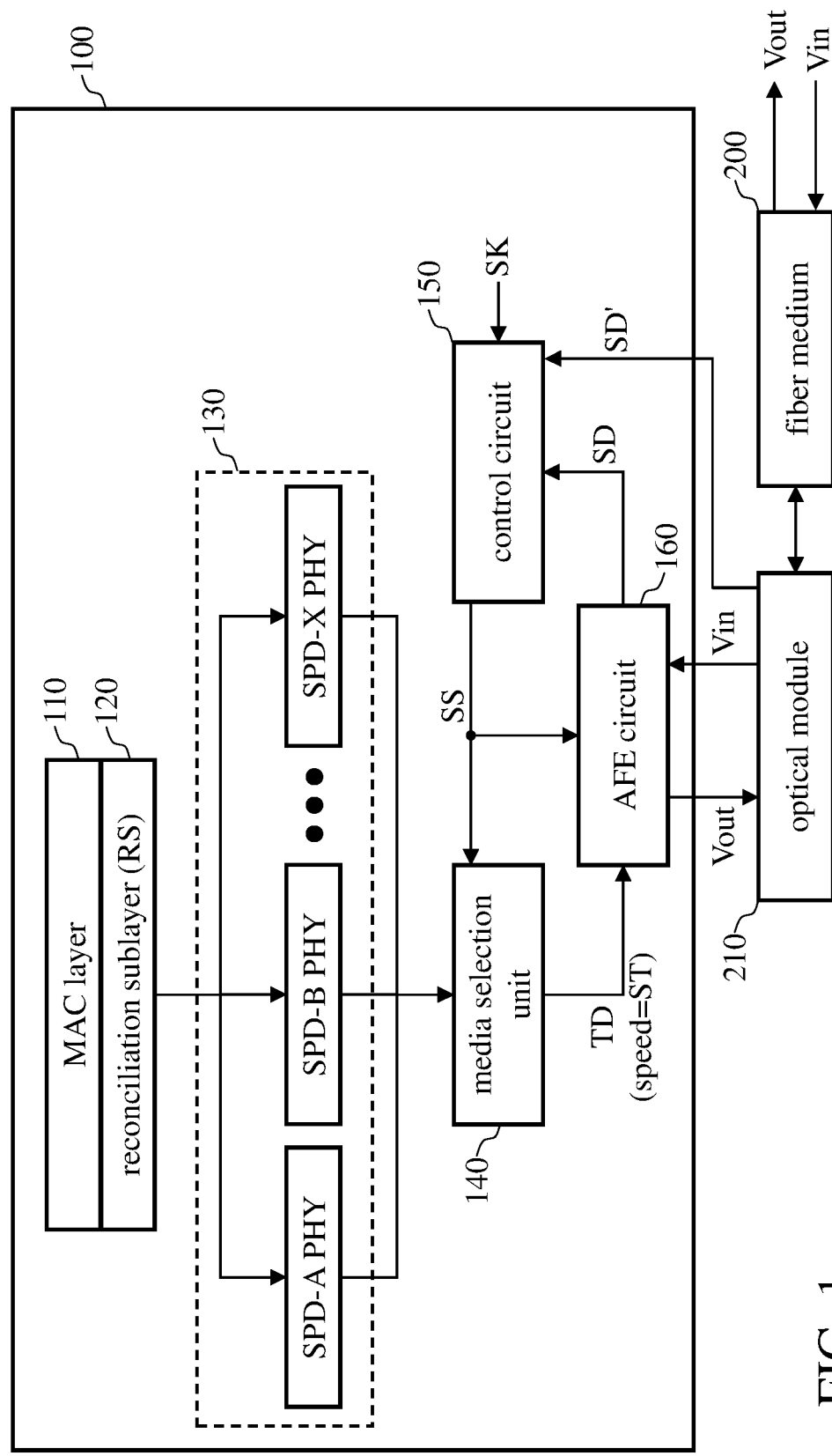
FIG. 1 illustrates a schematic diagram of the control chip of the network device according to an embodiment of the present invention.

FIG. 1 is a schematic diagram of the control chip of the network device according to an embodiment of the present invention. The network device can be a router, a switch, or a terminal device (such as a server, a computer, or other devices that has the network function). The control chip 100 implements the OSI model. However, FIG. 1 only shows the MAC layer 110, the reconciliation sublayer (RS) 120, and a part of the physical layer 130, and other layers that are less relevant to the technologies of this disclosure are omitted. The control chip 100 further includes a media selection unit 140, a control circuit 150, and an analog front-end (AFE) circuit 160. The control chip 100 transmits the output signal Vout and receives the input signal Vin through the optical module 210 and the fiber medium 200. One of the functions of the optical module 210 is to perform conversion between optical signals and electrical signals. Therefore, the optical module 210 may also be referred to as a photoelectric conversion element.

The AFE circuit 160 receives the input signal Vin through the optical module 210 and the fiber medium 200 and detects the amplitude or energy of the input signal Vin to generate a detection signal SD, which represents the amplitude or energy of the input signal Vin. The technique of detecting the amplitude or energy of a signal is well known to people having ordinary skill in the art, and the details are thus omitted for brevity. When the amplitude or energy of the input signal Vin is greater than a threshold (e.g., the detection signal SD corresponding to a first level), the input signal Vin can be determined to be a meaningful signal; on the contrary, when the amplitude or energy of the input signal Vin is not greater than the threshold (e.g., the detection signal SD corresponding to a second level), the input signal Vin can be determined to be a meaningless signal, which may indicate a link-failure of the receiving path of the local device.

The control circuit 150 generates a speed setting signal SS according to the preset speed SK and the detection signal SD. The media selection unit 140 selects, according to the speed setting signal SS, one of the physical layer transmit data of multiple speeds (the physical layer transmit data SPD-A PHY of speed SPD-A, the physical layer transmit data SPD-B PHY of speed SPD-B, . . . , the physical layer transmit data SPD-X PHY of speed SPD-X) as the target transmit data TD of the control chip 100. The speed of the target transmit data TD is the target speed ST of the control chip 100. In some embodiments, the media selection unit 140 may be a multiplexer.

In other embodiments, the detection signal SD can be replaced with the detection signal SD'. The detection signal SD' is generated by measuring loss of signal (LOS) by the optical module 210 in the fiber medium 200 and can also be used to represent the amplitude or energy of the input signal Vin (the larger the loss of signal, the smaller the amplitude or energy of the input signal Vin).

Figure 2:
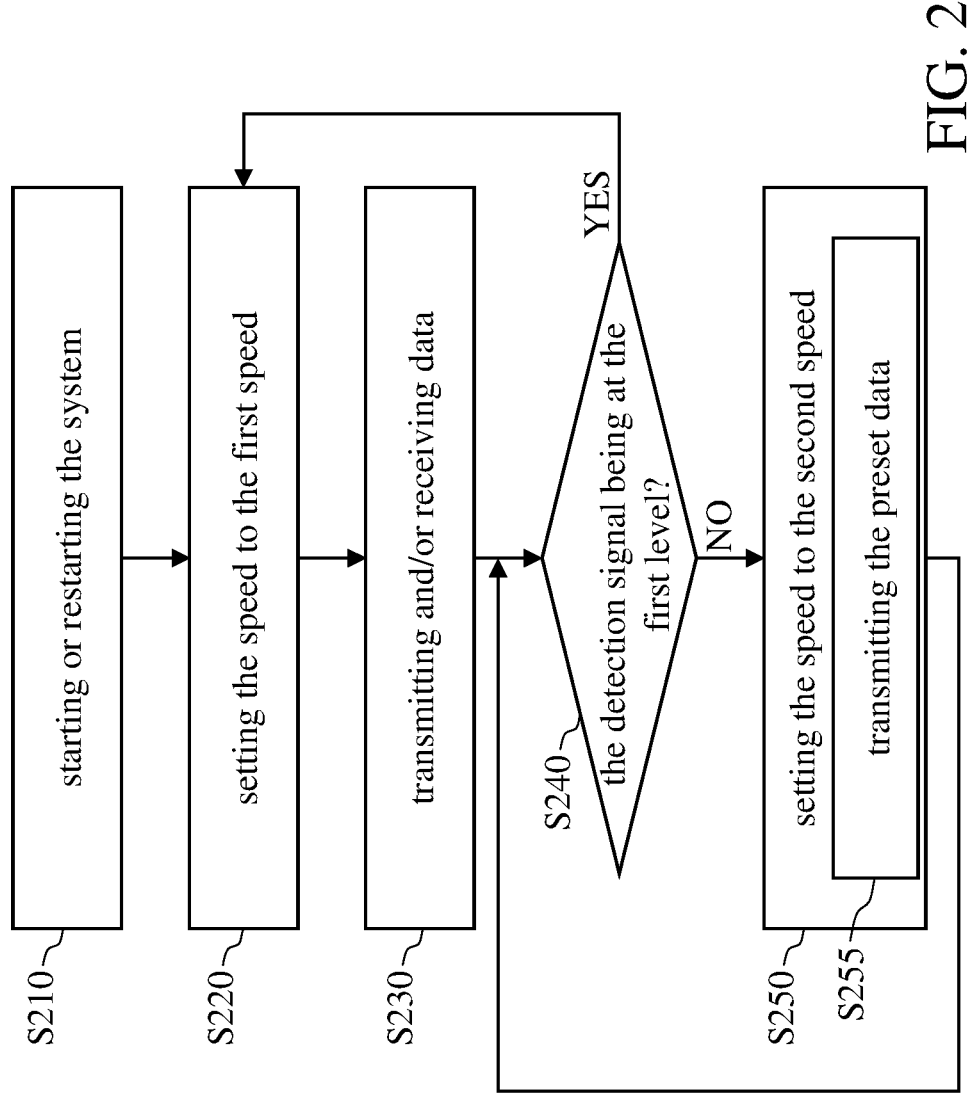
FIG. 2 illustrates a flowchart of the operation method of the network device according to an embodiment of the present invention.

Reference is made to FIG. 2, which is a flowchart of the operation method of the network device according to an embodiment of the present invention. The steps of FIG. 2 are performed by the control circuit 150. First, after the system of the network device is started or restarted (step S210 in which the control circuit 150 performs some initialization procedures), the control circuit 150 controls, through the speed setting signal SS, the media selection unit 140 to set the speed of the network device to the first speed (for example, when the first speed is the preset speed SK which is SPD-A, the media selection unit 140 selects the physical layer transmit data SPD-A PHY) (step S220), and then the control circuit 150 controls, through the speed setting signal SS, the AFE circuit 160 to transmit and/or receive data at the first speed (step S230). Next, the control circuit 150 determines whether the detection signal SD is at the first level (step S240). The detection signal SD being at the first level (e.g., the high level) indicates that the amplitude or energy of the input signal Vin is greater than the threshold; the detection signal SD being not at the first level (e.g., the detection signal SD being at the low level) indicates that the amplitude or energy of the input signal Vin is not greater than the threshold. In other words, step S240 is equivalent to monitoring whether the detection signal SD changes its level and is also equivalent to determining whether the amplitude or energy of the input signal Vin is greater than the threshold.

When the detection signal SD is at the first level (the result of step S240 is YES, that is, the amplitude or energy of the input signal Vin is greater than the threshold), the control circuit 150 maintains the speed of the network device the first speed (step S220) and proceeds to transmit and/or receive data (step S230).

When the detection signal SD is not at the first level (the result of step S240 is NO, that is, when the detection signal SD changes from the first level to the second level), the control circuit 150 controls, through the speed setting signal SS, the media selection unit 140 to set the speed of the network device to the second speed (step S250). The second speed is different from the first speed. For example, if the first speed is 2500BASE-FX (i.e., 2500 M bps), the second speed can be, for example but not limited to, 1000BASE-X (i.e., 1000 M bps) or 100BASE-FX (i.e., 100 M bps). The options of the combinations of the first speed and the second speed include 5000BASE-X (i.e., 5000 M bps), 2500BASE-FX (i.e., 2500 M bps), 1000BASE-X (i.e., 1000 M bps) or 100BASE-FX (i.e., 100 M bps) or the like. The speeds 1000BASE-X and 100BASE-FX are defined and described in detail in IEEE 802.3, and the definitions of 5000BASE-X and 2500BASE-X can be obtained by the designer or manufacturer by adjustment or extension according to practical requirements and the definition of 1000BASE-X.

Step S250 includes sub-step S255: the control circuit 150 transmits the preset data to the link partner. The preset data, for example, can be an Idle code group which is a 4 b/5 b code group defined under the 100BASE-X protocol or an IDLE ordered sets which is an 8 b/10 b code group defined under the 1000BASE-X protocol. One of the functions of the Idle code group or the IDLE ordered sets is to notify the link partner that the local device is idling (i.e., no data packet is being sent) but the link-up remains. Because the local device has changed its speed in step S250, the link partner afterwards cannot correctly decode the preset data received; as a result, the link partner will switch to the unlinked state. After switching from the link-up state to the unlinked state, the link partner stops transmitting packets, so as to avoid packet loss and prevent causing problems to the upper layer(s) of the OSI model.

After step S250 finishes, the control circuit 150 proceeds to determine whether the detection signal SD is at the first level (step S240). When the receiving path of the local device is back to normal (the result of step S240 is YES, that is, the local device can receive the signal from the link partner again), the control circuit 150 sets the speed of the local device to the first speed (step S220). In this way, the link partner can establish the link-up with the local device again, and both can resume normal packet transmission and/or reception.

In some embodiments, the second speed in step S250 is less than the first speed. For example, if the first speed is 2500BASE-X, the second speed can be 1000BASE-X or 100BASE-FX.

When the network quality is poor, the network device implements the down speed function, utilizing a lower data rate to improve the signal transmission quality in an attempt to establish a link-up, thereby increasing the probability of establishing a link-up between two network devices. For example, if a local device and a link partner that both support 1000BASE-X or 100BASE-FX cannot establish a link-up at the speed of 1000BASE-X, both devices will down speed to 100BASE-FX and reconnect.

Figure 3:
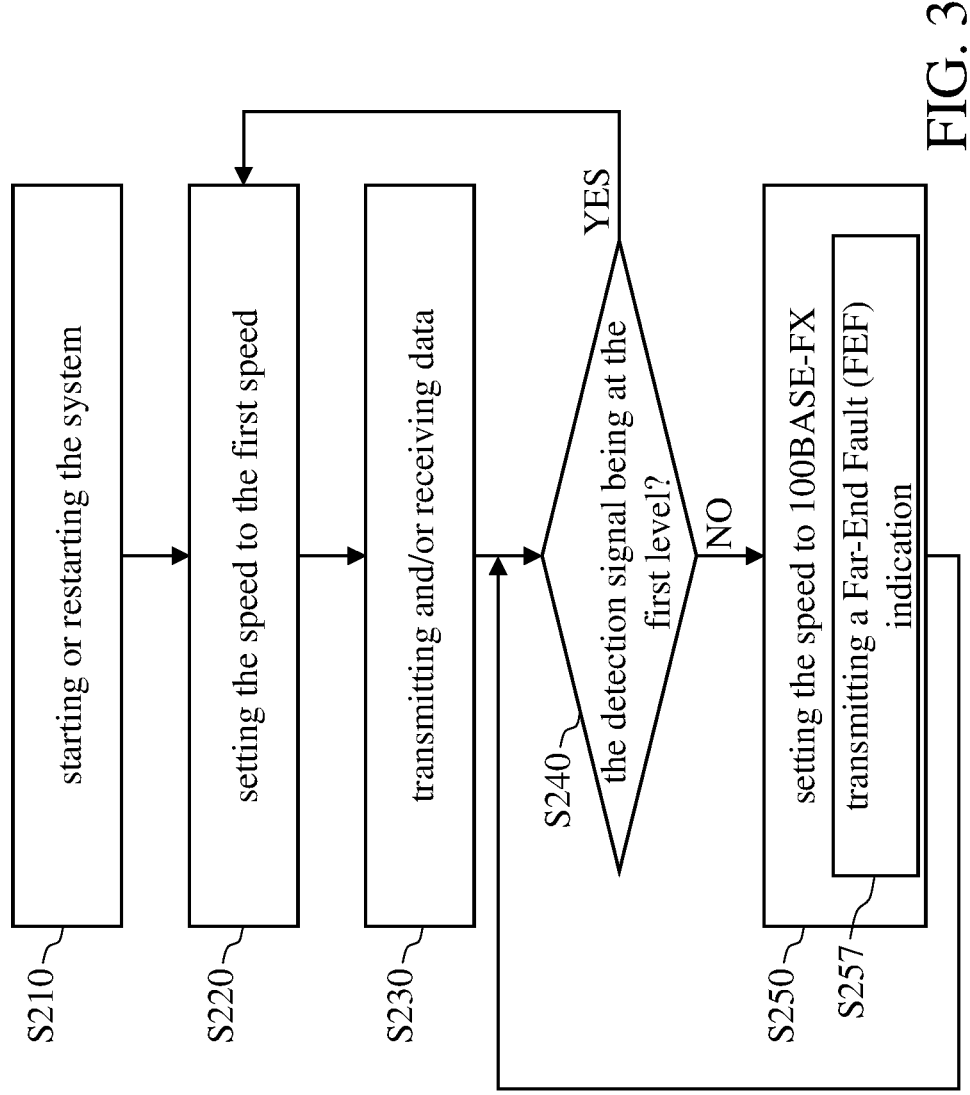
FIG. 3 illustrates a flowchart of the operation method of the network device according to another embodiment of the present invention.

Based on the aforementioned down speed function, the present invention also provides an operation method of a network device, and FIG. 3 shows the flowchart. The flow of FIG. 3 is also performed by the control circuit 150. Steps S210-S240 in FIG. 3 are the same as those in FIG. 2, so the details are thus omitted for brevity. In this embodiment, the second speed is 100BASE-FX, and step S250 includes sub-step S257: the control circuit 150 transmits a Far-End Fault (FEF) indication, which is only defined in the 100BASE-FX protocol. Because after step S250 the link partner that implements the down speed function reduces its own speed to 100BASE-FX (as a result, the link partner and the local device are operating at the same speed), the control circuit 150 of the local device can thus send the FEF indication to the link partner at the speed of 100BASE-FX to notify the link partner that the local device is faulty. In comparison with FIG. 2, in the embodiment of FIG. 3, the link partner can quickly learn that the local device is faulty and/or the cause of the fault at the local device; therefore, the link partner can respond quickly.

Figure 4:
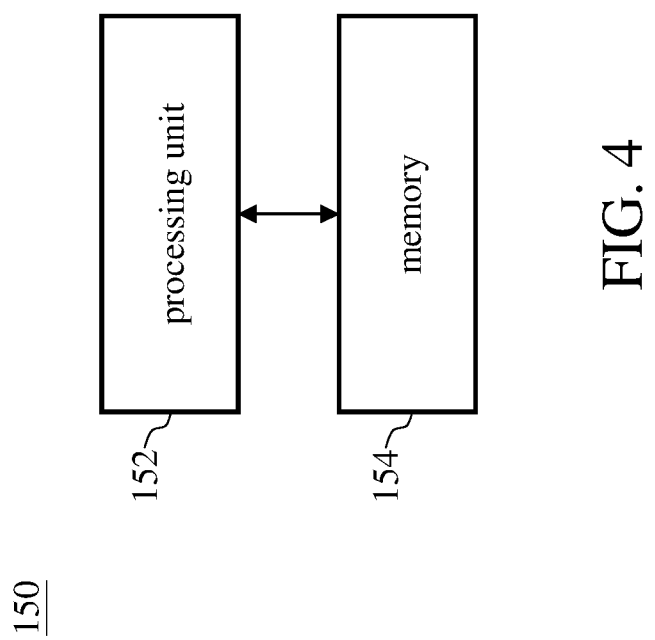
FIG. 4 illustrates a functional block diagram of the control circuit according to an embodiment.

Reference is made to FIG. 4, which is a functional block diagram of the control circuit 150 according to an embodiment. The control circuit 150 includes a processing unit 152 and a memory 154. The processing unit 152 may be a circuit or electronic component with program execution capability, such as a central processing unit, a microprocessor, or a micro-processing unit, which executes program instructions or program codes stored in the memory 154 to perform the flow of FIG. 2 or FIG. 3.

In other embodiments, people having ordinary skill in the art can design the control circuit 150 based on the above discussions, that is, the control circuit 150 can be an application specific integrated circuit (ASIC) or embodied by circuits or hardware such as a programmable logic device (PLD) or finite state machine (FSM).

According to the present invention, the control chip of the network device and the operation method of the network device can prevent the one-sided link-up state, and therefore can effectively avoid packet loss or prevent causing problems to the upper layer(s) of the OSI model.

Since a person having ordinary skill in the art can appreciate the implementation detail and the modification thereto of the present method invention through the disclosure of the device invention, repeated and redundant description is thus omitted. Furthermore, the shape, size, and ratio of any element in the disclosed figures are exemplary for understanding, not for limiting the scope of this invention. Moreover, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An operation method of a network device, the network device receiving an input signal from a link partner through a fiber medium, the method comprising:
    setting a target speed of the network device to a first speed;
    transmitting and/or receiving data at the first speed; and
    setting the target speed of the network device to a second speed which is different from the first speed and transmitting an Idle code group or IDLE ordered sets at the second speed to notify the link partner that an up-link to the link partner remains when an amplitude or energy of the input signal is not greater than a threshold;
    wherein the link partner is not operating at the second speed when the Idle code group or IDLE ordered sets is being transmitted.

2. The method of claim 1, wherein the second speed is less than the first speed.

3. The method of claim 2, wherein the second speed is 100BASE-FX, and the method further comprises:
    transmitting a Far-End Fault (FEF) indication.

4. The method of claim 1, wherein the link partner switches to an unlinked state after receiving the Idle code group or IDLE ordered sets.

5. A control chip of a network device, the network device receiving an input signal from a link partner through a fiber medium, the control chip comprising:
    an analog front-end (AFE) circuit configured to receive the input signal;
    a control circuit configured to generate a speed setting signal according to a first speed and a detection signal, wherein the detection signal represents an amplitude or energy of the input signal; and
    a media selection unit coupled to the control circuit and configured to determine a target speed of the network device according to the speed setting signal;
    wherein when the detection signal indicates that the amplitude or energy of the input signal is greater than a threshold, the control circuit controls, through the speed setting signal, the media selection unit to select the first speed as the target speed, and when the detection signal indicates that the amplitude or energy of the input signal is not greater than the threshold, the control circuit controls, through the speed setting signal, the media selection unit to select a second speed as the target speed and transmits an Idle code group or IDLE ordered sets at the second speed to notify the link partner that an up-link to the link partner remains, the second speed being different from the first speed;
    wherein the link partner is not operating at the second speed when the Idle code group or IDLE ordered sets is being transmitted.

6. The control chip of claim 5, wherein the second speed is less than the first speed.

7. The control chip of claim 6, wherein the second speed is 100BASE-FX, and the control circuit further transmits a Far-End Fault (FEF) indication through the AFE circuit.

8. The control chip of claim 5, wherein the control circuit comprises a memory and a processing unit, and the processing unit executes a plurality of program instructions or program codes stored in the memory to generate the speed setting signal according to the first speed and the detection signal.

9. The control chip of claim 5, wherein the detection signal is generated by the detection of the amplitude or energy of the input signal by the AFE circuit.

10. The control chip of claim 5, wherein the link partner switches to an unlinked state after receiving the Idle code group or IDLE ordered sets.

* * * * *